United States Patent
Baba et al.

(10) Patent No.: US 6,466,409 B1
(45) Date of Patent: Oct. 15, 2002

(54) NEGATIVE PRESSURE SLIDER WITH TEMPERATURE-INSENSITIVE FLYING HEIGHT FOR DISK STORAGE DEVICE

(75) Inventors: Sachiyo Baba, Yamato; Hiroyasu Tsuchida, Yokohama; Shunichiro Ota, Machida; Toyomi Ohsawa, Kawasak, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/622,765
(22) PCT Filed: Mar. 18, 1998
(86) PCT No.: PCT/JP98/01171
§ 371 (c)(1),
(2), (4) Date: Nov. 3, 2000
(87) PCT Pub. No.: WO99/48098
PCT Pub. Date: Sep. 23, 1999

(51) Int. Cl.$^7$ .......................... G11B 5/60; G11B 15/64; G11B 17/32; G11B 21/20
(52) U.S. Cl. ............................................. 360/236.3
(58) Field of Search .............................. 360/237, 236.6, 360/235.8, 236.3, 235.5, 235.4, 234.3, 230

(56) References Cited

U.S. PATENT DOCUMENTS

| | | | |
|---|---|---|---|
| 5,325,030 A | 6/1994 | Yamamura et al. | 318/563 |
| 5,969,899 A | 10/1999 | Utenick et al. | 360/78.04 |
| 5,991,113 A * | 11/1999 | Meyer et al. | 360/234.7 |
| 6,016,234 A * | 1/2000 | Blank et al. | 360/75 |
| 6,069,770 A * | 5/2000 | Cui et al. | 134/2 |
| 6,117,283 A * | 9/2000 | Chen et al. | 204/192.16 |

FOREIGN PATENT DOCUMENTS

| | | | |
|---|---|---|---|
| JP | 6-76518 A | * | 3/1994 |
| JP | 8-106749 A | * | 4/1996 |
| JP | 8-203056 A | * | 8/1996 |
| JP | 9-115259 A | * | 5/1997 |
| WO | WO 95/13612 | * | 5/1995 |

OTHER PUBLICATIONS

Integrated Suspension Assembly with Reduced Slider Distortion, IBM Tech. Discl. Bull. (Oct. 1, 1996) 39, 10, 101–102.*

Head Suspension Assembly with Reduced Slider Distortion, IBM Tech. Discl. Bull. (Oct. 1, 1996) 39, 10, 173–174.*

* cited by examiner

Primary Examiner—Robert S. Tupper
Assistant Examiner—Juli Anne Watko
(74) Attorney, Agent, or Firm—Robert B. Martin; Bracewell & Patterson, L.L.P.

(57) ABSTRACT

The present invention relates to controlling the flying height of a magnetic head or slider relative to a magnetic disk in a disk storage device. The flying height of the negative pressure slider is not affected by changes in temperature. By controlling a ratio of crown sensitivity of the flying height to camber sensitivity of the flying height, changes in flying height due to the crown change of the slider corresponding to temperature changes are canceled. It is necessary to set a ratio of the area of a reverse step surface, R, to the area of a center rail, C, within a range of 2:1 to 6:1 (preferably 4:1 to 6:1; ideally 5:1). Then, setting can be performed so that the center of the substantially negative pressure generated may be the center of the slider surface.

10 Claims, 11 Drawing Sheets

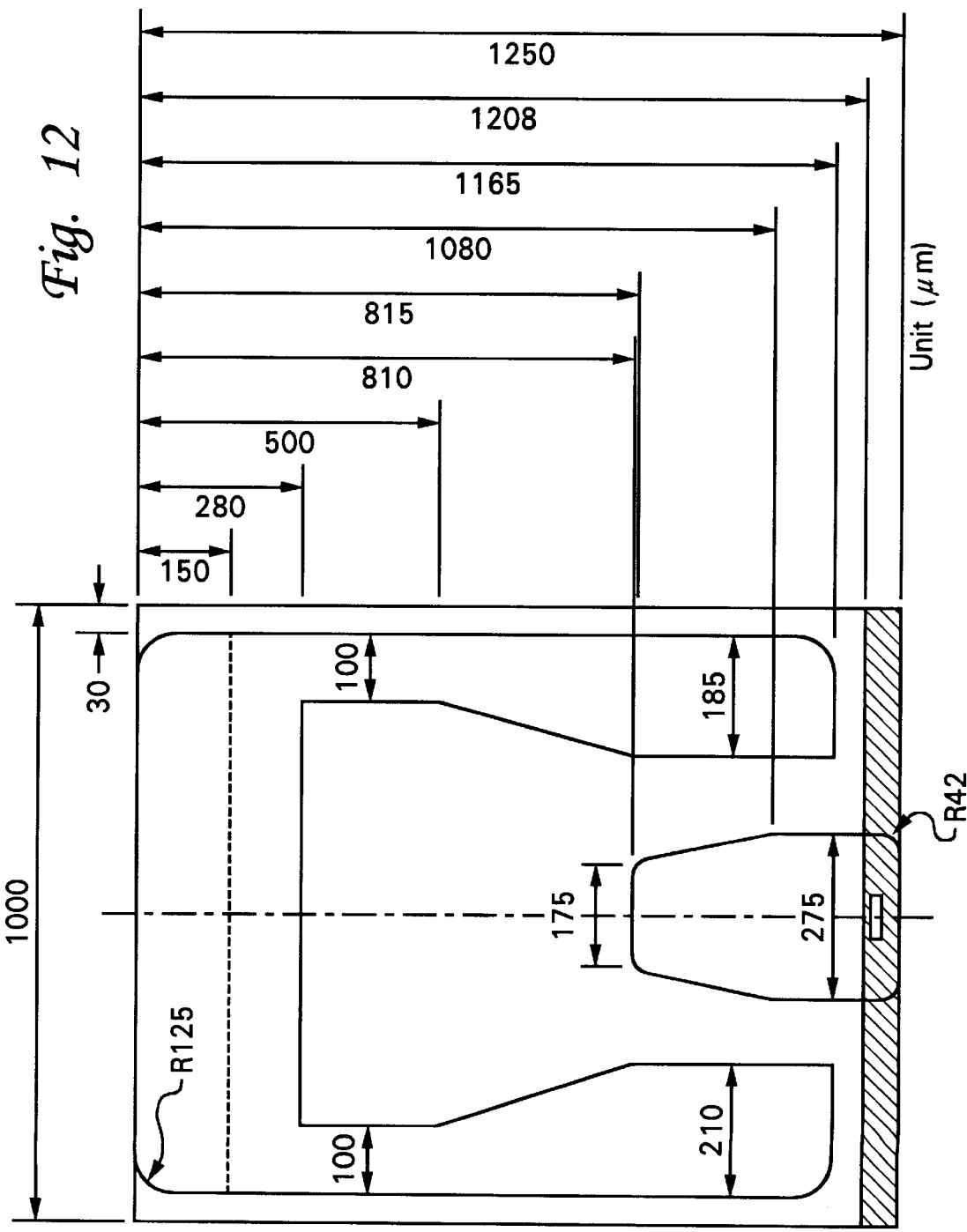

NEGATIVE PRESSURE SLIDER WITH TEMPERATURE-INSENSITIVE FLYING HEIGHT FOR DISK STORAGE DEVICE

BACKGROUND OF THE INVENTION

1. Technical Field

The present invention relates to controlling the flying height of a magnetic head or slider relative to a magnetic disk in a disk storage device. More specifically, the present invention relates to the design of a negative pressure slider having a flying height that is not affected by changes in temperature.

2. Description of the Related Art

As the storage density of hard disk drives (HDDs) in magnetic disk storage devices increases, the HDDs are exposed to increasingly high-temperature environments. For example, as external factors, personal computers (notebook-sized personal computers and desktop personal computers) themselves that are objects that the HDDs are built in, are also downsized and further highly functioned. Therefore, heating values per unit area are apt to increase. In addition, since the HDDs themselves also generate heat from their insides with their operation, similarly to the densification reduction of thickness of package, reduction of diameter of disk and high functioning, the heating values per unit area also are apt to increase. Therefore, by mixing these external factors with internal factors, the HDDs are forced to be installed in severe high-temperature environments. From the background like this, HDDs are requested to have performance corresponding to a large temperature change with supposing that the HDDs are installed and used in the high-temperature environment.

When the HDDs operate under the large temperature change, reliability of the HDDs becomes important. Therefore, first, the internal construction and functions of the HDDs that relate to the reliability as an object of the present invention, will be described schematically. After that, relation between these construction and functions, and the temperature change will be described.

As shown in FIGS. 1(*a*) and 1(*b*), in a well-known method in the field of HDDs, a cantilever mechanism 20, which supports a magnetic head 40 with traversing a surface of a magnetic disk 10 that rotates around a spindle in the direction shown by an arrow and is concentric circular, is driven by an actuator mechanism (this is also called a head positioner) 30. Here, a rotary actuator mechanism driven with a shaft as the center is shown. Owing to the operation of these mechanisms, the magnetic head 40 is positioned at a desired position on the surface of the magnetic disk so as to allow read/write on the magnetic disk.

As shown in FIG. 2 with being enlarged, the magnetic head 40 is mounted on an end of the cantilever mechanism 20. Here, only a set necessary for sandwiching a sheet of magnetic disk from the face and back of the sheet of magnetic disk is shown. Nevertheless, two magnetic heads are mounted on two cantilever mechanisms 20 with facing each other so as to align the magnetic heads to both of the face and back of the sheet of magnetic disk. Inside an HDD (refer to FIG. 1) internally having a plurality of magnetic disks for increasing memory capacity, this plurality of cantilever mechanisms 20 is piled (in consequence, this becomes comb-shaped) so that the plurality of cantilever mechanisms 20 can enter at a time between the plurality of magnetic disks. In this specification, for convenience, this cantilever mechanism 20 or this piled mechanism will be called a suspension comprehensively.

In addition, a mechanism configured by the magnetic head 40 and suspension 20 will be called a suspension assembly. Furthermore, a mechanism including also an actuator mechanism 30 driving the mechanism composed of the magnetic head 40 and suspension 20 will be called an actuator mechanism assembly.

In this specification, the magnetic head 40 is a generic name of a mechanism that writes data by magnetizing a desired position on a surface of a magnetic disk, and on the contrary, reads data from a surface magnetized. In order to perform such functions, recently in particular, in a down-sized magnetic head 40, for example, a write transducer and read magnetizing means are separately provided at the location 42. As the read magnetizing means, means using a magnetoresistive effect and means using a giant magneto resistive effect that has a larger magnetic resistance change than this are put into practice.

It is defined in this specification that the magnetic head 40, as shown in FIG. 3, is equivalent to the slider 40. The write transducer and read magnetizing means at the location 42 directly perform magnetic functions in the magnetic head 40. Therefore, there was significance of distinguishing the magnetic head from the other parts in case only the parts at the location 42 were treated as different parts. Nevertheless, recently, downsizing of the slider itself progresses, and hence the write transducer and read magnetizing means are formed at a small range of the location 42 on the slider in one piece at the same time of forming the slider. Hence, there is no significance of distinguishing these parts as the different parts. Thus, although the slider in this specification indicates the mechanism including the write transducer and read magnetizing means the technical idea of the present invention can be also applied to a mechanism not including these mechanisms. Therefore, it is natural to widely comprehend the meaning of the slider.

In a state of the magnetic disk rotating, an air bearing is formed by airflow (air flows along the direction of an arrow, but refer to FIG. 9 for a detailed direction), induced by the rotation, on a slider surface 46 where the slider faces a surface of the magnetic disk. Therefore, the slider, as shown in FIG. 4, is made to float above the surface of the magnetic disk. Owing to this, since the slider can flexibly follow the unevenness of the surface of the magnetic disk at the time of the magnetic disk rotating, high-speed data transfer can be realized. Although a rectangular solid of the slider shown has six surfaces as a solid (hexahedron), a surface called a "slider surface" is only one surface of the slider that faces the surface of the magnetic disk. This slider surface is the most important slider construction that is an object of the present invention.

FIG. 4 shows a state of the slider flying above the magnetic disk rotating. Airflow induced by the rotation flows along the direction of an arrow. In order to perform a function of flying that the slider has, "flying height (this is also called a flying amount or a flying gap)" h is extremely important. If the flying height is excessively low, the slider may physically contact to the surface of the magnetic disk or a fine convex part being thereon. Then, although the probability of the contact decreases if the flying height is made sufficiently high, now, a sufficient magnetic interaction with the magnetic disk cannot be performed, and hence this is not suitable to high-density data storage.

With high densification of HDDs, the size of sliders also has been downsized. Sliders from standard sliders (these are also called 100% sliders) to nano-sliders (these are also called 50% sliders) that are further smaller than the standard sliders are widespread. Presently, sliders called pico-sliders (these are also called 30% sliders) that are subminiature are going to be put to practical use. Furthermore, studies of femto-sliders (these are also sometimes called 20% sliders) that are ultra subminiature are going to be advanced, and hence practical use will be performed in the near future.

As one of magnetic interactions between the magnetic disk and magnetic head, overwrite of data on a surface of the magnetic disk will be discussed. Since information is overwritten on information previously written on the surface of the magnetic disk with the same track width, a characteristic of overwrite changes according to the flying height of the slider. Thus, this is because, by the slider highly flying, data write to the surface of the magnetic disk cannot be completely performed, and is hence a reproduced output fluctuates, and a data-erasing error arises. The smaller the track width is made so as to increase data recording-density, the more the problem of overwrite that is caused by off-track is emphasized, and hence it can be easily comprehended that such a problem becomes important. From the viewpoint of the magnetic head stably acting to such small track width, it is important that desired flying height is kept as constant as possible.

The above-described problems can be applied to data read that is a different magnetic interaction between the magnetic disk and magnetic head. This is because, after overwriting information with the same track width on the information previously recorded, read is performed with the same track width. If the flying height is high, it is not possible to obtain an output, having sufficient amplitude, from the magnetic disk. In addition, the resolution of a reproduced signal is expressed by a ratio between an output at the maximum usable frequency and an output at the minimum usable frequency. Therefore, also from the viewpoint of stabilizing this resolution, it is important to keep the desired flying height as constant as possible.

An off-track, which is affected by temperature, among off-tracks affecting the overwrite and resolution of a reproduced signal is especially called a "thermal off-track." To be direct, the present invention approaches control of the flying height to be set above the surface of the magnetic disk rotating. By controlling the flying height by the present invention, it is possible to indirectly suppress the thermal off-track to a minimum.

Although there are an optical method and the like for measuring the physical flying height itself, it is considerably difficult to measure low flying height. Therefore, by measuring a success rate of these overwrites and the stability of resolution of the reproduced signal by an electric signal, fed back from the magnetic head, when temperature changes, the stability of the flying height can be estimated on the contrary. Nevertheless, the difference of the stability of the overwrites and the stability of resolution of the reproduced signal easily occurs substantially (in particular, in a case of using an rotary actuator shown in FIG. 9) at a position r in the radial direction where the magnetic head is located above the magnetic disk. Therefore, it is appropriate to evaluate performance over the entire data recording range of the magnetic disk.

In case read/write data is particularly focused, the flying height h at a position of a write transducer and a position of read magnetizing means (these positions are shown by the location 42 in FIG. 3) is a direct measuring object also from the significance of the electric signal obtained. This should be called magnetic flying height or the like. On the other hand, if collisions and contacts are treated as important problems, the shortest physical distance between the slider and magnetic disk is focused as the flying height. This should be called physical flying height or the like. If a coating, which is irrelevant to data recording, is provided at predetermined thickness on the surface of the magnetic disk, the magnetic flying height is higher than the physical flying height by its thickness. Thus, it is different in every existing state of things what distance at what position of the slider should be focused in regard to the "flying height." Nevertheless, the flying height of the slider in the present invention should be comprehended in sufficiently wide meaning within a range between which the technical idea of the present invention can be applied. In particular, as long as the "flying height" is comprehended as a "flying height change," the difference between the magnetic flying height and physical flying height does not appear.

Since it is inevitable that the slider is in a flying state, the slider is hydrodynamically affected in various aspects. As shown in FIG. 5, the slider is supported at a pivot point 22 in the suspension side in the approximate center (with viewing two-dimensionally, this corresponds to the center of the slider surface) of the back of the slider. Owing to such a point support, the slider can take a comparatively free flying posture through motions of a pitching P and a rolling R. From FIG. 5, directions of the motions can be comprehended.

The flying height minutely changes according to a pitching angle (an angle appearing in the pitching direction) in a state of the slider flying. It will be discussed that a delicate taper (an angle shown by $\alpha$ in a partially cross-sectional view in the right-hand side of FIG. 11) is provided in the inflow end side of the slider. Although a front tapered part attempts to fly by largely receiving the inflow of air, on the contrary, a part after the pivot point attempts to sink like a seesaw.

In general, a dominant factor determining the flying height of the slider from the hydrodynamic viewpoint is positive pressure (flying force) occurred on the slider surface. Generally speaking, the faster the magnetic disk rotates, the higher this positive pressure becomes. On the other hand, an elastic force (a force strengthening a force pressing the slider to the magnetic disk as a deflection increases) by a load spring in the cantilever mechanism occurs from the suspension. Therefore, the flying height h of the slider is determined in a state of this elastic force and the flying force balancing. Such a principle can be easily comprehended from layout in FIG. 4.

Although the above-described construction is approximately common in HDDs using sliders, there are sliders, which partially generate negative pressure on slider surfaces, especially among the sliders. FIGS. 6(a) and 6(b) show such a slider. In regard to the construction, this slider is to obtain pneumatic structure stiffness, which is effectively large, under an apparently light load with simultaneously using negative pressure occurred on a reverse step surface 48 (also, refer to FIG. 11) that is structurally a concave part formed in the slider surface. In general, such a slider is called a negative pressure (NP) slider. With using such a negative pressure slider, the slider flies from the time of the magnetic disk rotating at low speed, and hence flying stability at the time of normal rotating speed is increased. Since the time of the slider contacting to the magnetic disk is short, high reliability can be obtained, in particular, in a so-called contact start stop (CSS) method.

Although angular velocities $\omega$ are the same at a most inner position in the radial direction and a most outer position in the radial direction that are in the magnetic disk, peripheral velocities v (=rω) are different from each other at a position in the radial directions, r (refer to FIG. 9). In this case, by using the negative pressure slider, it is possible to make the flying height as constant as possible regardless of the peripheral velocity of the magnetic disk. For example, even if positive pressure increases in some measure due to increase of the peripheral velocity, it is possible to well adjust the entire positive pressure by generating the negative pressure matching with the positive pressure. It is convenient in such significance for a high-density recording slider, whose flying height is low, to use the negative pressure slider.

As shown in FIG. 6(a), it is common for the slider surface of the slider, that is, the slider surface to have morphological characteristics such as a crown and a camber. The crown is the maximum height of a convex surface provided in the longitudinal direction that is an inflow direction of air to or an outflow direction of air from the slider. In addition, the camber is the maximum height of a convex surface provided in the lateral direction, which is orthogonal to this longitudinal direction, or the cross direction. A major reason why these morphological characteristics, that is, the crown and camber are provided is to endure repeated contacts by preventing stiction in take-off at the time of start or landing at the time of stop between the slider and magnetic disk.

FIG. 6(b) shows signals of the crown and camber, that is, a positive signal (+) and a negative signal (−) on these morphological characteristics. Here, in case a delicate taper (an angle shown by a in a partial cross-sectional view in the right side of FIG. 11) is provided in the inflow end side of the slider, an end portion of the taper is defined as a height datum.

Nevertheless, the morphological characteristics, that is, the crown and camber inevitably affect airflow largely, and the slider itself is affected by a change of the airflow. This can be easily imagined from the fact that the curve of a cross-section of an airplane wing largely relates to flight characteristics (buoyancy and the like) of the airplane.

In this specification, for convenience of explanation, it is assumed that the direction of the crown being formed is called as a longitudinal direction or a crown direction, and the direction of the camber being formed is called as a lateral direction or a camber direction. Thus, it should be paid sufficient attention that, when the crown direction and camber direction are used, these words do not indicate the convex shapes of the crown itself and the camber itself.

Hereinbefore, the construction and functions inside an HDD according to the present invention are described schematically. Next, it will be described in detail how the flying height of the slider is affected by a temperature change.

Since the viscosity of air itself inside the HDD, which is an enclosure, changes when temperature changes, flying height of the slider changes owing to this. For example, the viscosity becomes low when the temperature increases. Nevertheless, within a temperature (or temperature change amount) range to be supposed at the time of designing the HDD, the change of flying height caused by the viscosity is minute. Therefore, this change is smaller than changes of the flying heights that are caused by the crown and camber.

Actually, there is a factor of being affected by the temperature in such construction itself that the slider is supported by the suspension. It is caused by thermal expansion coefficients of materials. This principle will be described with reference to FIGS. 7(a) to 7(c). Usually, materials having different thermal expansion coefficients are used for the slider 40 and suspension 20 where the slider is attached. Therefore, when the temperature of the slider and suspension change to the same temperature, the slider and suspension change curve in one body through an action effect similar to a well-known bimetal so long as the temperature is different from the temperature at which the slider and suspension were assembled bonded.

FIG. 7(a) is a perspective view showing the difference of stretch that is caused through assemble of materials having different thermal expansion coefficients. FIG. 7(b) is a perspective view showing the curve that is caused through assemble of materials having different thermal expansion coefficients. Furthermore, FIG. 7(c) is a perspective view showing such a countermeasure, which a third material is sandwiched, against the curve. The reason why the slider and suspension change the curve in one piece through the action effect similar to a bimetal is as follows. Thus, if a material having a relatively large thermal expansion coefficient and a material having a relatively small thermal expansion coefficient are assembled, the material having the relatively large thermal expansion coefficient attempts to expand, and the material having the relatively small thermal expansion coefficient is suppressed on expansion with making a neutral plane a boundary plane. Thus, as shown in FIG. 7(a), if there is the difference, as shown by arrows, between an expansion amount of an upper surface (the slider 40) and an expansion amount of a lower surface (the suspension 20) due to temperature rise, the curve arises as shown in FIG. 7(b). Such a curve causes changes of both of the crown and camber. This curve acts in the direction of reducing the crown and camber in case of following a state in FIG. 7(b) with assuming that the state in FIG. 6(a) is made as a basis. If the curvature is uniform over the entire slider surface and the length in the crown direction on the slider surface is longer than that is in the camber direction, the change of the crown appears more than the change of the camber.

Here, as a countermeasure, it is conceivable that the change of the curvature is made smooth by inserting a third material, having a thermal expansion coefficient that is intermediate between thermal expansion coefficients of the material used for the slider 20 and the material used for the suspension 40, between the slider and suspension as shown in FIG. 7(c). Nevertheless, it is difficult to completely suppress the curvature itself. For example, there is a place for devising the material property and coating thickness of an adhesive since the adhesive that is the third material is used for bonding the slider and suspension. Nevertheless, such countermeasures do not lead to a complete solution to suppress the change of the curve.

Since such a change of the curve caused by an action similar to the bimetal changes the crown and camber of the slider surface, the change of the curve changes relative distance between each position on the slider surface and the magnetic disk. For example, the flying height of the write transducer and read magnetizing means 42 is changed.

Nevertheless, it is necessary to pay attention to the fact that the influence of the curve further largely appears as a change of hydrodynamic flying characteristics of the slider. It is because the shape change of the slider surface changes airflow. In particular, it is considered that the change of the curve changes the balance between positive pressure and negative pressure, which occur on the slider surface, in a negative pressure slider. Thus, since the change of the flying characteristics of the slider largely changes the flying height, this affects the change of, that is, degrades the overwrite characteristics.

In order to eliminate the influence of the temperature change in such construction, it can be imaged to incorporate a temperature control mechanism, avoiding the temperature change itself, in the HDD. Nevertheless, it is considerably difficult to realize such construction inside the miniaturized HDD. Therefore, it is smart to treat this problem by accurately understand such an essence of the principle that the temperature change affects the flying height of the slider.

SUMMARY OF THE INVENTION

A temperature change rate of a crown is the change amount of the crown (refer to FIG. 6) to the temperature change amount. This is caused by the action effect similar to the bimetal described above. This dimension is the change amount of the crown divided by the temperature change amount, and the unit is treated as nm/° C. A temperature change rate of a camber is the change amount of the camber to the temperature change amount. This also is caused by the action effect similar to the bimetal described above. This dimension is the change amount of the camber divided by the temperature change amount, and the unit is treated as nm/° C.

These temperature change rates of a crown and a camber each are obtained from the slope of a graph by plotting values of the crown or camber, which is measured, on the graph with changing the temperature. In the graphs, the reason why crowns and cambers that should be bases are different is individual difference. Nevertheless, a value calculated from each graph is the change amount of the crown divided by the temperature change amount or the change amount of the camber divided by the temperature change amount. Therefore, it can be seen that these linear inclinations are approximately the same respectively.

From the experiment results shown in graphs of FIGS. 8(a) and 8(b), it is calculated that the temperature change rate of the crown (FIG. 8(a)) is −0.372 nm/° C. and the temperature change rate of the camber (FIG. 8(b)) is −0.173 nm/° C.

Next, it will be evaluated how the temperature change of the crown or camber finally appears as a change of a hydrodynamic flying characteristic of the slider. Thus, it is evaluated how the shape change of the slider surface affects the flying height in consequence after varying airflow. In the present invention, a concept that is called sensitivity will be introduced for the evaluation.

"Crown sensitivity of flying height" is an extent of the change of the flying height in consequence after the is change of hydrodynamic characteristics with the crown (refer to FIG. 6) being changed by an effect, which is similar to the bimetal, and the like through the temperature change. It may be considered that the flying height decreases spatially (three-dimensionally) with the crown increasing if only relative distance from the magnetic disk is supposed. Nevertheless, actually, the flying height increases as the result of changes of hydrodynamic characteristics.

"Camber sensitivity of flying height" is an extent of the change of the flying height in consequence after the change of hydrodynamic characteristics with the camber (refer to FIG. 6) being changed by an effect, which is similar to the bimetal, or the like through the temperature change. The flying height decreases as the result of changes of hydrodynamic characteristics with the camber increasing.

Each unit of these sensitivities is a flying height change divided by a change amount of the crown or a flying height change divided by a change amount of the camber, and these are dimensionless amounts treated as, for example, nm/nm.

Both of sensitivities are affected by a set range of the reverse step surface in the slider surface. Here, the "set range" means whether the slider surface is used by setting the reverse step surface in what size of a two-dimensional area. After all, this has wide meaning including also a position where the reverse step surface is located. By adequately selecting this set range, it is possible to adjust and select each sensitivity and further a ratio of these sensitivities. It can be comprehended that is because a state (balance of positive and negative pressure) of negative pressure occurring in the negative pressure slider changes by changing the set range.

The present invention well uses such property that these two types of sensitivities appear mutually in reverse as the flying height in the increasing and decreasing directions. If it is possible to substantially cancel the change of flying height caused by the change of the crown of the slider caused by a temperature change and the change of flying height caused by the change of the camber of the slider, it is possible that the flying height does not change even if the temperature changes. A new point of the present invention is a design technique of skillfully considering such temperature changes.

Here, each parameter is defined as follows. A subscript of a term means that the term relates to the subscript. Units are described between brackets.

T: Temperature change rate [nm/° C.]

Δt: Temperature change (amount) (temperature difference from ordinary temperature) [° C.]

S: Sensitivity [dimensionless]

F: Flying height change [nm]

CF: Canceled flying height change [nm]

P: alumina protrusion change [nm]

Subscript w: Item relating to a crown [nm]

Subscript m: Item relating to a camber [nm]

Subscript p: Item relating to an alumina protrusion [nm]

According to these expressions, the design technique of the present invention is expressed below in Equations 1 to 4. (Temperature change rate of a crown) % (temperature change) % (crown sensitivity of flying height)=(Change of flying height regarding the crown):

$$Tw \times \Delta t \times Sw = Fw \qquad \text{Equation (1)}$$

(Temperature change rate of a camber) % (temperature change) % (camber sensitivity of flying height)=(Change of flying height regarding the camber):

$$Tm \times \Delta t \times Sm = Fm \qquad \text{Equation (2)}$$

(Flying height change regarding the camber)+(flying height change regarding the camber)=(Canceled flying height change):

$$Fw + Fm = CF \qquad \text{Equation (3)}$$

(Temperature change rate of an alumina protrusion) % (temperature change)=(alumina protrusion change):

$$Tp \times \Delta t = P \qquad \text{Equation (4)}$$

Here, assume that both of Tw and Tm are minus (FIGS. 8(a) and 8(b)). A plus signal (+) in parentheses shows that its value is positive, and a minus signal (−) shows that its value is negative. Further, assume the case Sw is plus (+) and Sm is minus (−). If temperature increases, Δt increases (+). In this case, Fw decreases (−) according to Equation (1), Fm increases (+) according to Equation (2), and P decreases (−) according to Equation (4). Therefore, difference of such signals that Fw decreases and Fm increases makes it possible for Fw and Fm to substantially cancel each other.

Here, the "substantial cancellation" should not be grasped in such narrow meaning that Fw and Fm completely cancel each other according to Equation (3) (to make CF=0). Nevertheless, it should be comprehended in such wide meaning that the flying height change regarding the crown and the flying height change regarding the camber can at least partially cancel each other. Thus, so long as an absolute value of CF becomes smaller than any one of absolute values of Fm and Fw that is larger than the other, it should be comprehended that it corresponds to this "substantial cancellation."

Since it is proper to separately describe the alumina protrusion expressed in Equation (4), its principle will be described later in detail. The temperature change rate of the alumina protrusion is a dimension similar to the temperature change rate of a crown and the temperature change rate of a camber, and a concrete value and a concrete unit of the slider used in the present invention are 0.080 nm/° C.

Comparison of A-type Slider and B-type Slider

It was verified with an experiment whether the design technique of the present invention is actually effective for stabilizing the flying height. For this purpose, by preparing two types of sliders, that is, an A-type slider (1:4) and a B-type slider (9:1), the experiment was performed. Here, a ratio of the crown sensitivity of the flying height to the camber sensitivity of the flying height is shown in parentheses. Since sensitivity is affected by a set range of the reverse step surface in the slider surface, two types sliders having such ratios of sensitivities can be realized by adequately setting the range of the reverse step surface in the slider surface two-dimensionally. It was verified whether the flying height changes were substantially canceled by comparing these two types sliders having extremely different ratios of sensitivities.

The reason why the ratio of sensitivities that is 1:4 in the A-type slider was adopted is as follows. From the experimental result in graphs of FIGS. 8(a) and 8(b), it is calculated that the temperature change rate of the crown, Tw is −0.372 nm/° C. and the temperature change rate of the camber, Tm is −0.173 nm/° C. These are used for calculating the flying height change regarding the crown, Fw and the flying height change regarding the camber, Fm by being multiplied by the crown sensitivity of the flying height, Sw and the camber sensitivity of the flying height, Sm respectively in Equations (1) and (2). Since it is the intention to minimize the canceled flying height change CF, it is desirable to set a plus signal (+) to either of Fw or Fm, and a minus signal (−) to the other, it is also desirable to set Fw and Fm to be absolute values as similar as possible. It can be seen that Sw/Sm can be 1/2.15 in consideration of Tw/Tm= 2.15 for this purpose. Thus, in case an optimum sensitivity ratio is deduced from only the theory up to this, 1:2.15 may be optimum.

Nevertheless, in this experiment, an optimum sensitivity ratio is deduced in consideration of the temperature change rate of the alumina protrusion, Tp=0.080 (nm/° C.). In consideration of this Tp, Tw/(Tm+Tp)=4, and hence Sw/Sm=1/4. Therefore, the slider having the sensitivity ratio of 1:4 was prepared. Nevertheless, it should be noted that there may be such a case that it is unnecessary to take it into account since this alumina protrusion does not occur depending on materials used for the slider. Hence, in order to widely grasp the technical idea of the present invention, the alumina protrusion as an element changing with temperature should be considered separately from elements relating to the crown and camber.

Here, it is assumed that a parameter A is defined as follows:

A: Actual flying height change [nm]

In consideration of the alumina protrusion, the parameter A is calculated in the next Equation (5) from relations in Equations (2) to (4).

(Flying height change regarding the crown)+(flying height change regarding the camber)+(alumina protrusion change)=(Canceled flying height change)+(the alumina protrusion change)=(Actual flying height change):

$$Fw+Fm+P=CF+P=A \qquad \text{Equation (5)}$$

These A-type slider and B-type slider were actually verified by experimenting overwrite stability and stability of resolution of a reproduced signal in a range from a most inner position in the radial direction to a most outer position in the radial direction that is a range where data is actually stored in the magnetic disk, by using a rotary actuator. FIG. 9 shows the angular range, where the data is stored, in the magnetic disk used for verification. Here, a skew angle β is an acute angle (a smaller angle) between the tangential direction of the circumference of the magnetic disk and the longitudinal direction of the slider. If the skew angle β becomes zero degree, the tangential direction of the circumference coincides with the longitudinal direction of the slider. If a rotary actuator is adopted, the cantilever mechanism 20 supporting the magnetic head is driven by the actuator mechanism 30 with its pivot as the center. Therefore, it is impossible to make the skew angle zero over the entire range from the most inner position in the radial direction to the most outer position in the radial direction. Since there are other factors such as a centrifugal force caused by rotation of the magnetic disk although airflow approximately coincides with the tangential direction of the circumference, the direction of the airflow does not completely coincide with the tangential direction of the circumference.

In consequence of verification by the above experiment, it became clear that, in the range from the most inner position in the radial direction to the most outer position in the radial direction, the A-type slider is better than the B-type slider on both sides of the overwrite stability and the stability of resolution of the reproduced signal. In other words, it was demonstrated that the flying height change of the A-type slider is smaller than that of the B-type slider in the range from the most inner position in the radial direction to the most outer position in the radial direction.

Next, FIGS. 10(a) and 10(b) show the results of simulating the flying height of the A-type slider (FIG. 10(a)) and the B-type slider (FIG. 10(b)). Here, the flying height was simulated hydrodynamically. Thus, it should be noted that the distance between the surface of the magnetic disk and the surface of the slider, which is obtained by hydrodynamic analysis, is focused. Thus, the flying height at this time is not grasped as a change amount, but is grasped as an absolute flying height. In FIG. 13, this is the same. Here, it should be noted that, only in FIGS. 10(a), 10(b), and 13, the unit of the flying height is micro-inch (one micro-inch is equal to 25.4 nm). Also, in regard to these figures, simulation was performed so that the range from the most inner position in the radial direction to the most outer position in the radial direction might be covered.

Symbol, a black square represents the flying height at 25° C. that is temperature in an ordinary state, Symbol, a black dot does the flying height at 0° C., and Symbol, a black triangle does the flying height at 60° C. respectively. The temperature 25° C. that is the temperature in the ordinary state is the temperature at the time of the slider 40 and suspension 20 being assembled as shown in FIGS. 7(*a*) to 7(*c*). In regard to FIGS. 10(*a*) and 10(*b*), it should be noted that it should not be evaluated whether the absolute value of the flying height itself is high or low. It is because it is a design item what value the flying height is set to be. Thus, the justice of the present invention should be evaluated by such a criterion that smaller fluctuation (a change amount caused by temperature change) between the black dot and black triangle is better. Furthermore, if the black square is selected as the basis, smaller difference between the black square and black dot means better effectiveness to a change at low temperature (temperature fall). In addition, smaller difference between the black square and black triangle means better effectiveness to a change at high temperature (temperature rise). In general, it should be noted that it is demonstrated that the A-type slider (FIG. 10(*a*)) has a smaller flying height change than the B-type slider (FIG. 10(*b*)).

BRIEF DESCRIPTION OF THE DRAWINGS

FIG. 12 is a top view where each size of the construction of the slider surface shown in FIG. 11 is written along a dimension line with making the unit mm (mm is equal to $10^3$ nm);

(FIG. 14(*a*)) and 60° C. (FIG. 14(*b*)) with making 25° C., which is temperature in an ordinary state, as the basis.

DETAILED DESCRIPTION OF THE PREFERRED EMBODIMENT

Construction of Slider and Slider Surface

Figure 9:
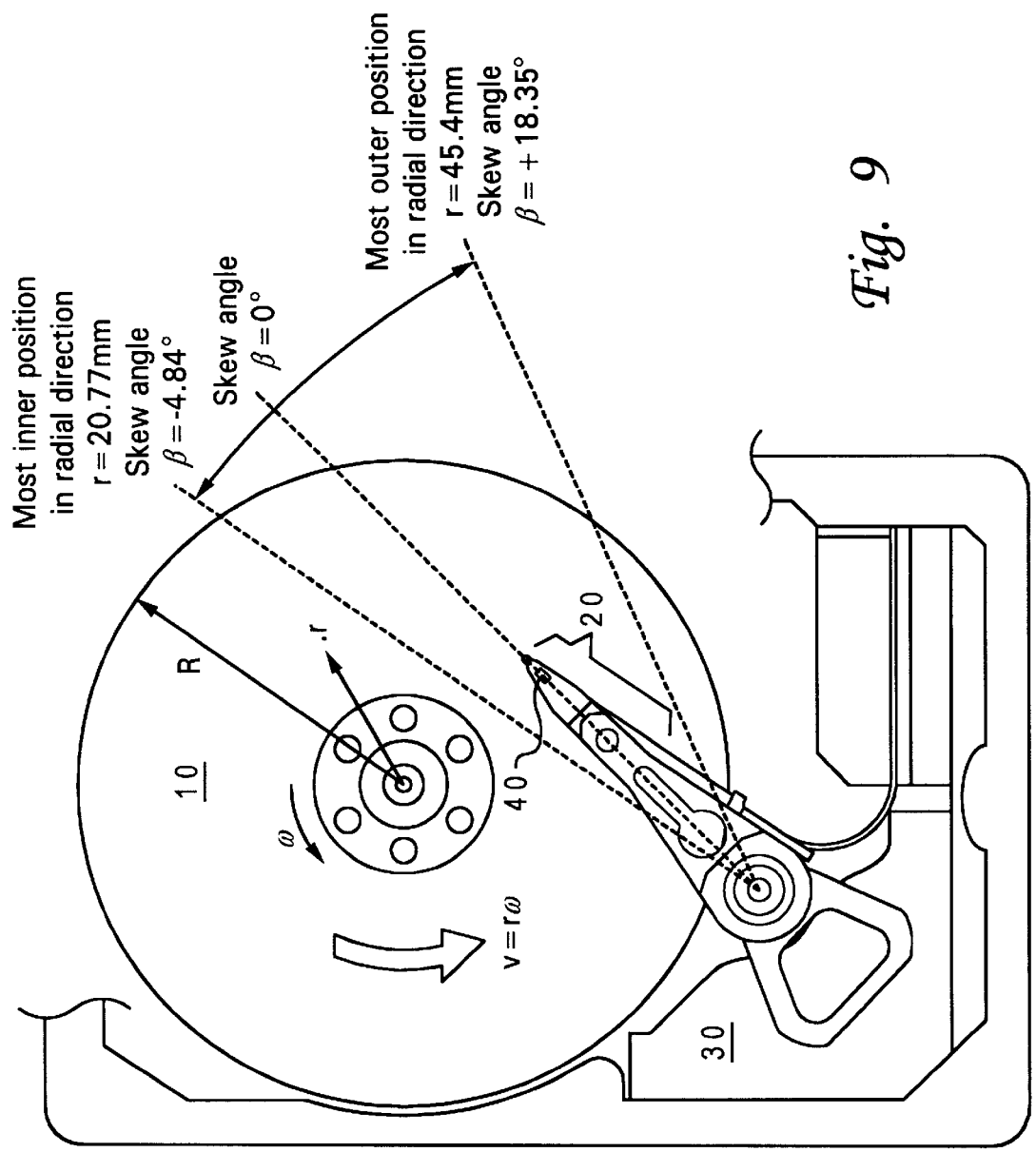
FIG. 9 is a top view showing a position in the radial direction and a skew angle b that are in a range within which data is stored in the magnetic disk.
Figure 11:
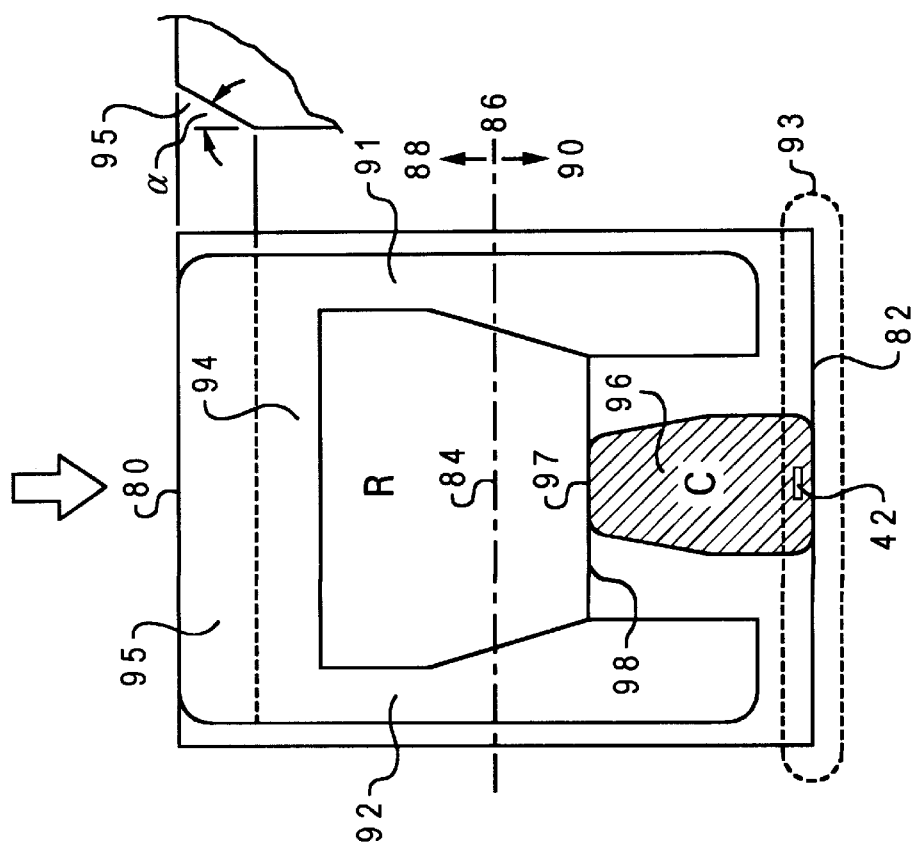
FIG. 11 is a top view showing the construction of a slider surface of a negative pressure slider using the present invention.

FIG. 11 illustrates a slider surface of a negative pressure slider used in the present invention. Names of the components of the slider will be described with reference to FIG. 11. An inflow edge 80 is an edge or an end into which air flows from the longitudinal direction of the slider when the slider flies at predetermined flying height above a surface of the rotating magnetic disk with facing the slider surface. Nevertheless, it should be noted that the inflow direction of air does not coincide with the longitudinal direction since the inflow direction changes due to the skew angle (refer to FIG. 9) except a case that the skew angle is zero degree.

An outflow edge 82 is an edge or an end from which air flows to the longitudinal direction of the slider when the slider flies at predetermined flying height above a surface of the rotating magnetic disk with facing the slider surface.

An inflow edge side or the direction of an inflow edge is the side near to the inflow edge or the longitudinal direction toward the inflow edge, 88 if, for example, a line 86 which extends from the center 84 of the slider to the lateral direction is set as the datum. It is only an example that the line 86 is set as the datum, and does not divide the slider surface into complete halves.

An outflow edge side or the direction of an outflow edge is the side near to the outflow edge or the longitudinal direction toward the outflow edge, 90 if, for example, a line-86 which extends from the center 84 of the slider to the lateral direction is set as the datum. It is only an example that the line 86 is set as the datum, and does not divide the slider surface into complete halves.

Figure 1A:
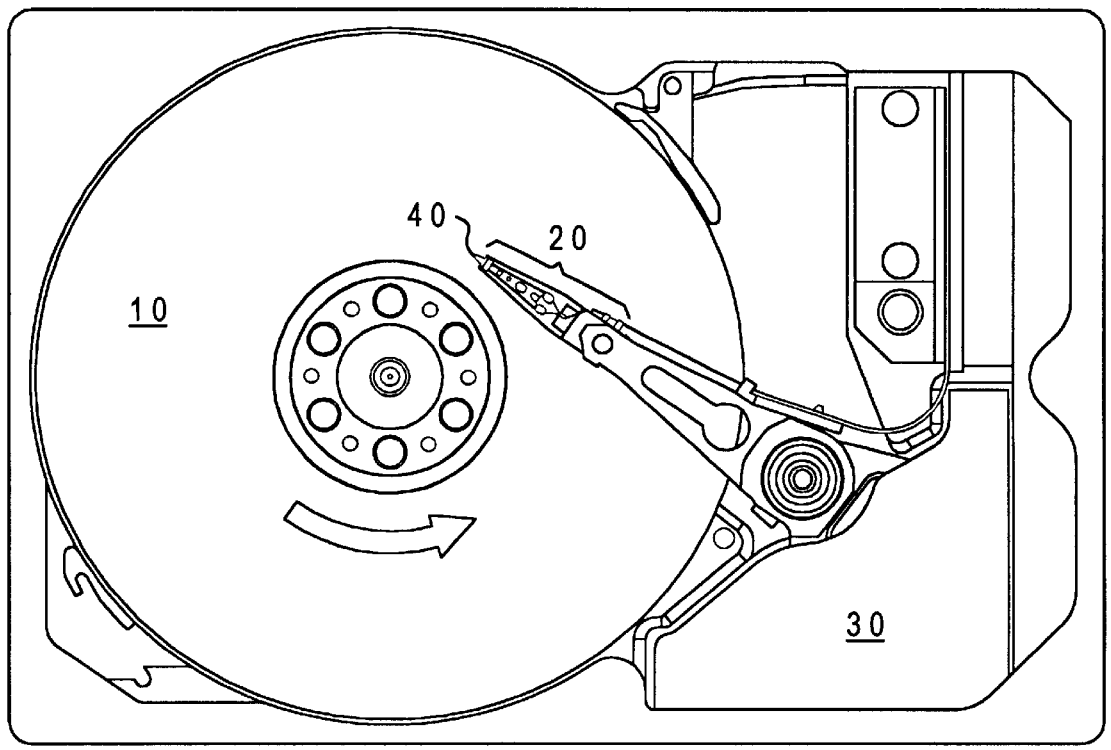
FIG. 1(*a*) is a top view showing the internal construction of a prior art HDD, and FIG. 1(*b*) is a perspective view showing the internal construction of the prior art HDD.
Figure 1B:
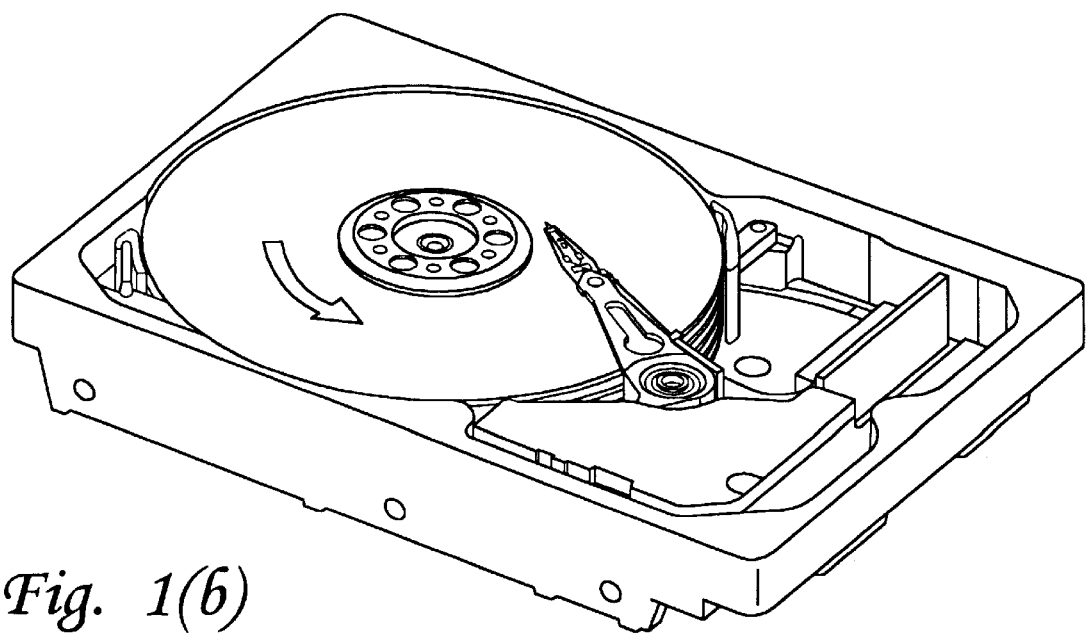
Figure 2:
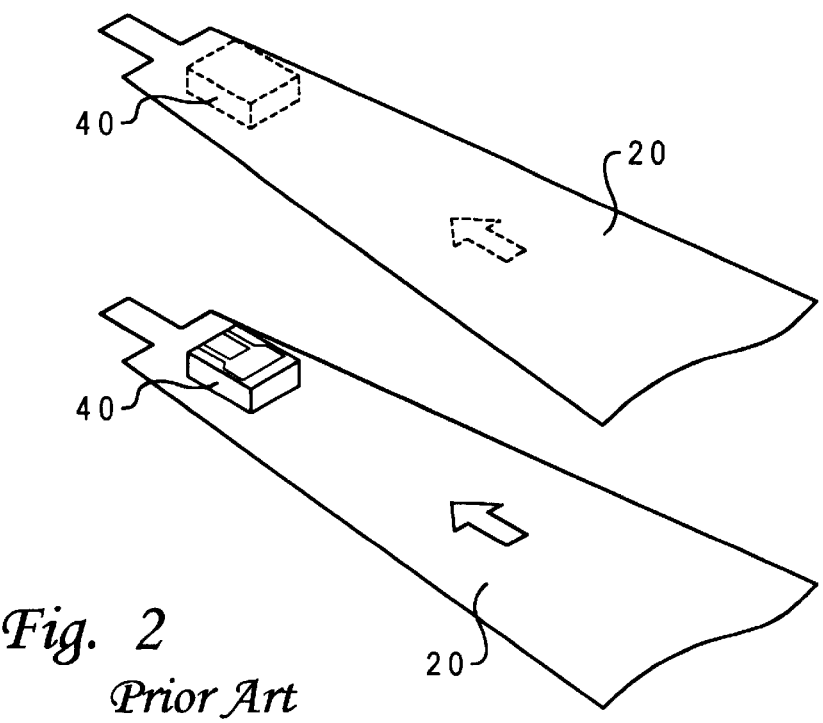
FIG. 2 is a perspective view showing such an aspect that a prior art magnetic head is attached in an end of a suspension having a cantilever mechanism.
Figure 3:
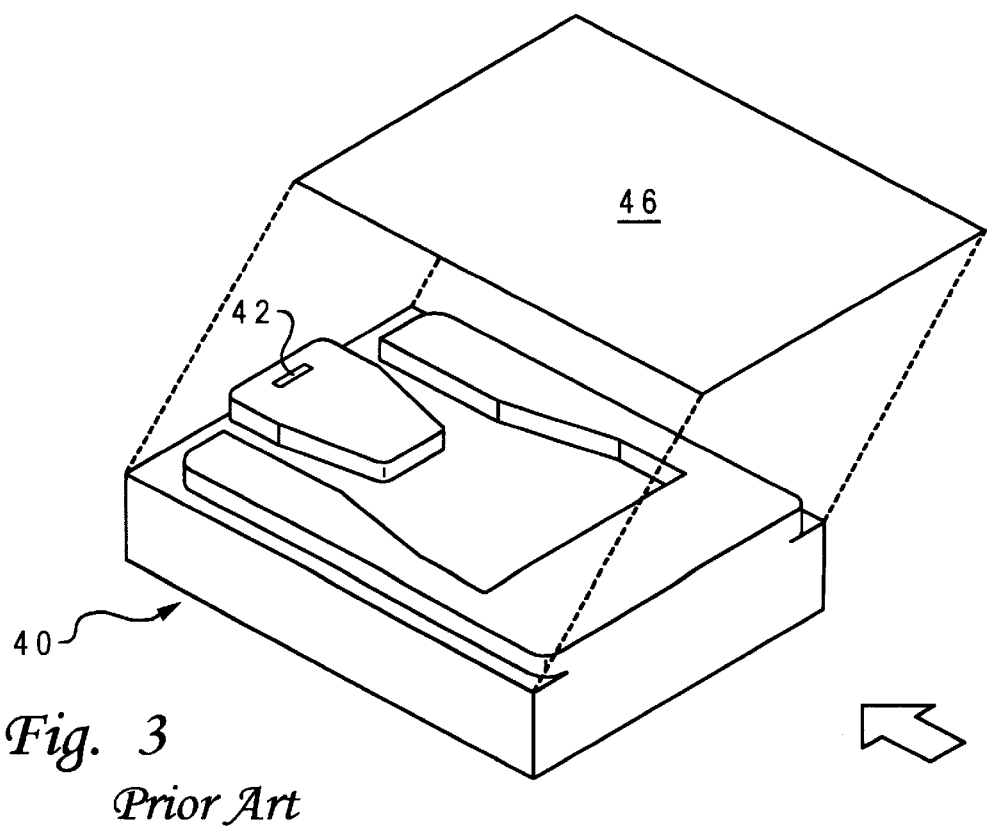
FIG. 3 is a perspective view showing a prior art slider and its slider surface.
Figure 4:
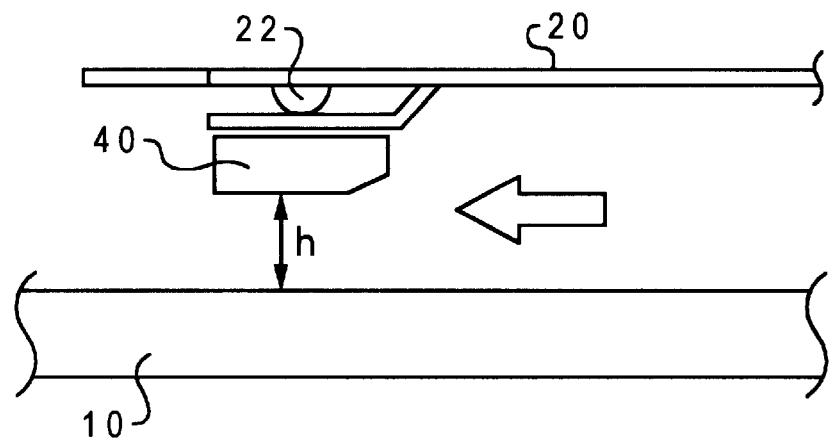
FIG. 4 is a drawing showing such a state that a prior art slider, which is supported by a suspension, flies above a magnetic disk rotating, and its flying height h.
Figure 5:
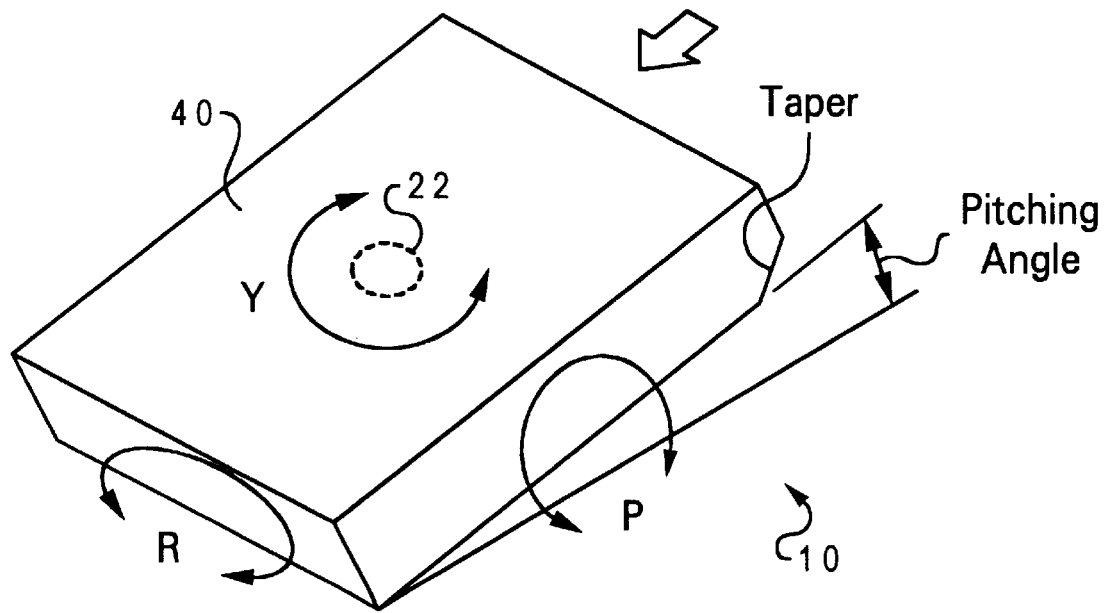
FIG. 5 is a perspective view showing a location of a pivot point support of the prior art slider, and a pitching P and a rolling R that are motions for taking a flying posture.
Figure 6A:
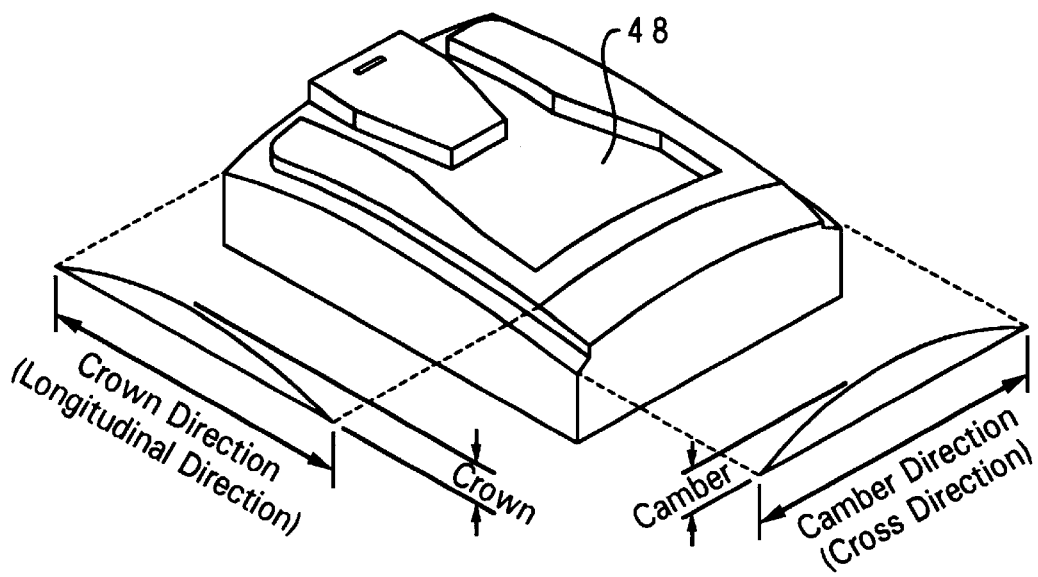
FIG. 6(*a*) includes a perspective view showing a prior art, negative pressure slider and an explanatory diagram of a crown and a camber having a morphological characteristic and in a longitudinal direction and a lateral direction, and FIG. 6(*b*) includes cross-sectional views showing signals of these crown and camber, that is, positive (+) or negative (−) of each morphological characteristic.
Figure 6B:
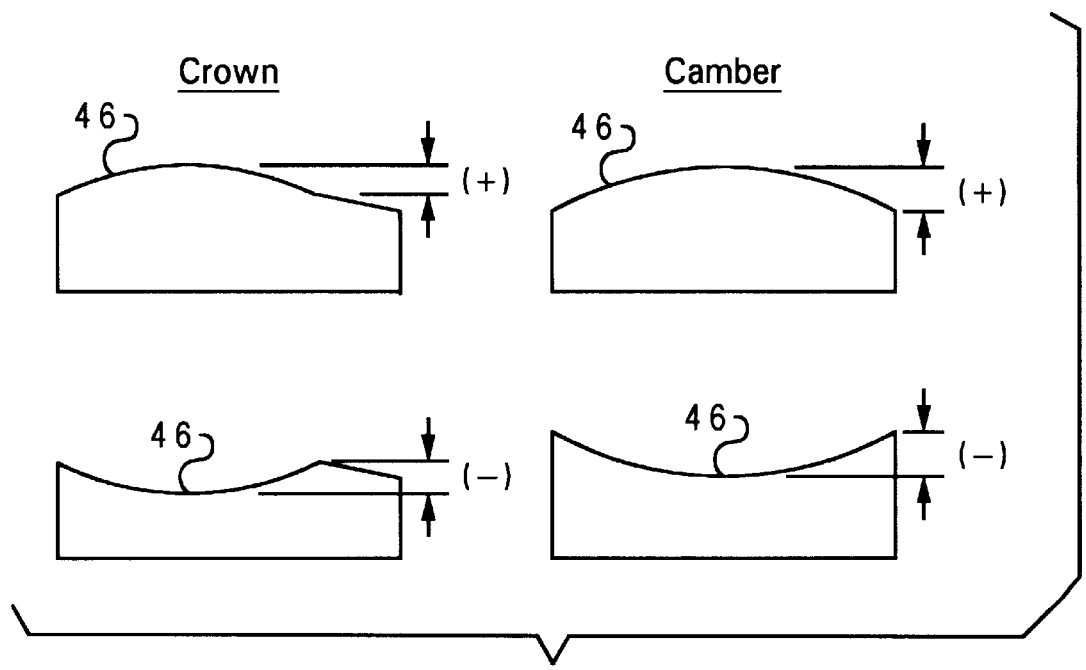
Figure 7:
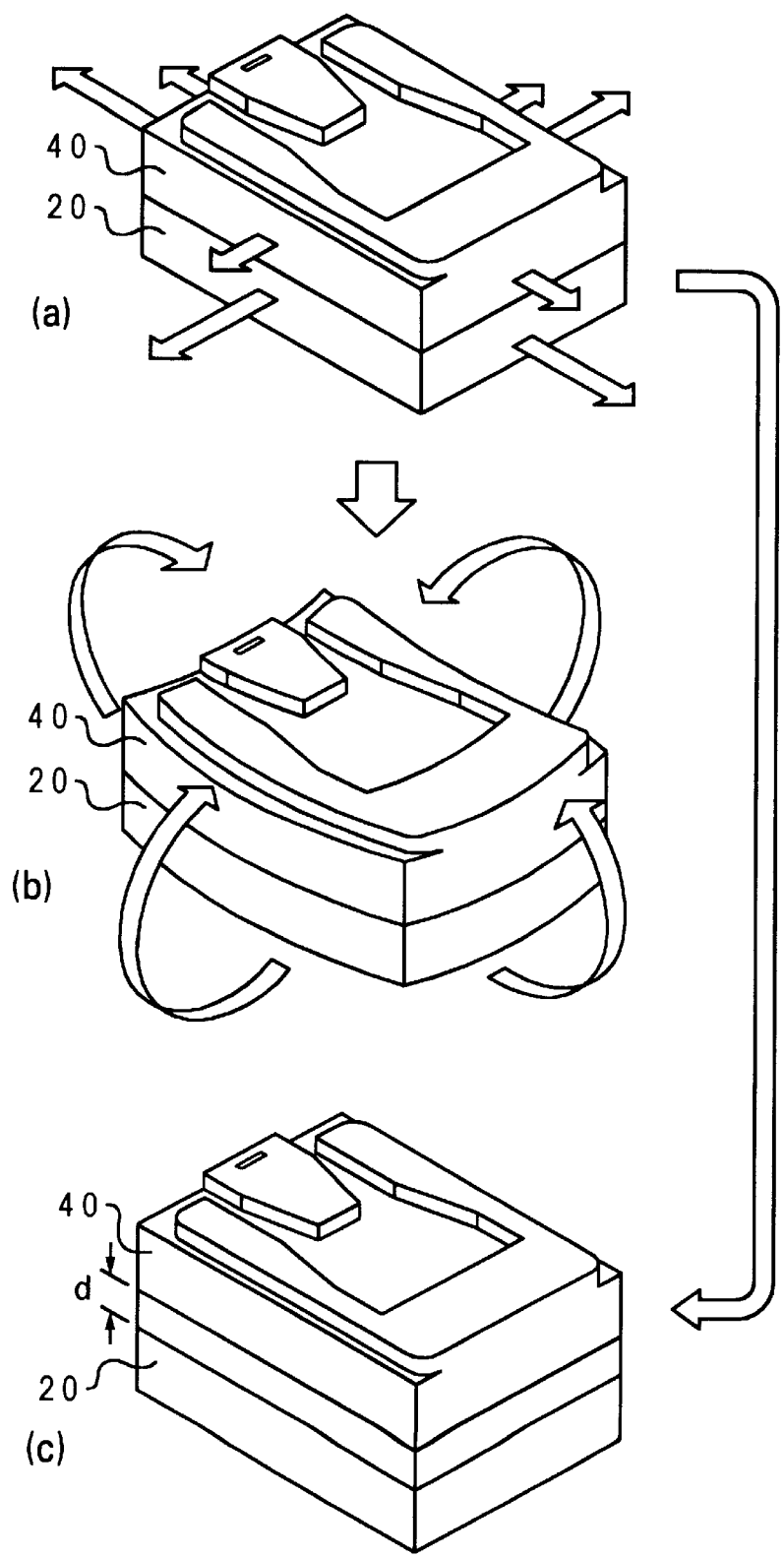
FIG. 7(*a*) is a perspective view showing the difference of stretch that is caused through assembly of materials having different thermal expansion coefficients, FIG. 7(*b*) is a perspective view showing the curve that is caused through assemble of materials having different thermal expansion coefficients, and furthermore, FIG. 7(*c*) is a perspective view showing such a countermeasure, which a third material is sandwiched, against the curve.
Figure 8B:
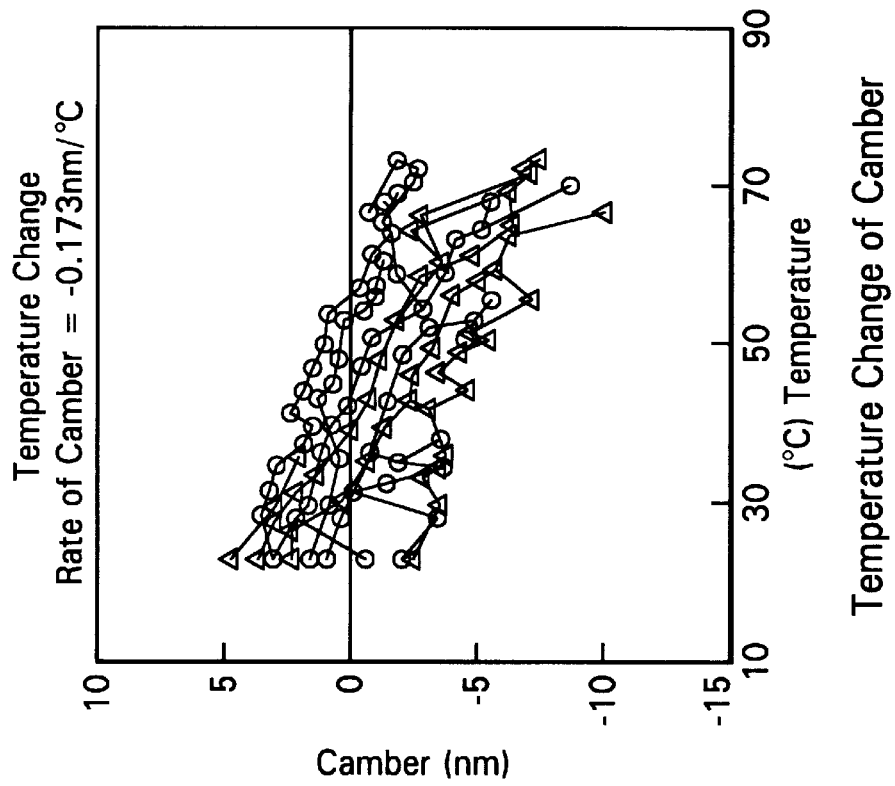
FIG. 8(*a*) is a graph showing the temperature change of a crown, and FIG. 8(*b*) is a graph showing the temperature change of a camber.
Figure 8A:
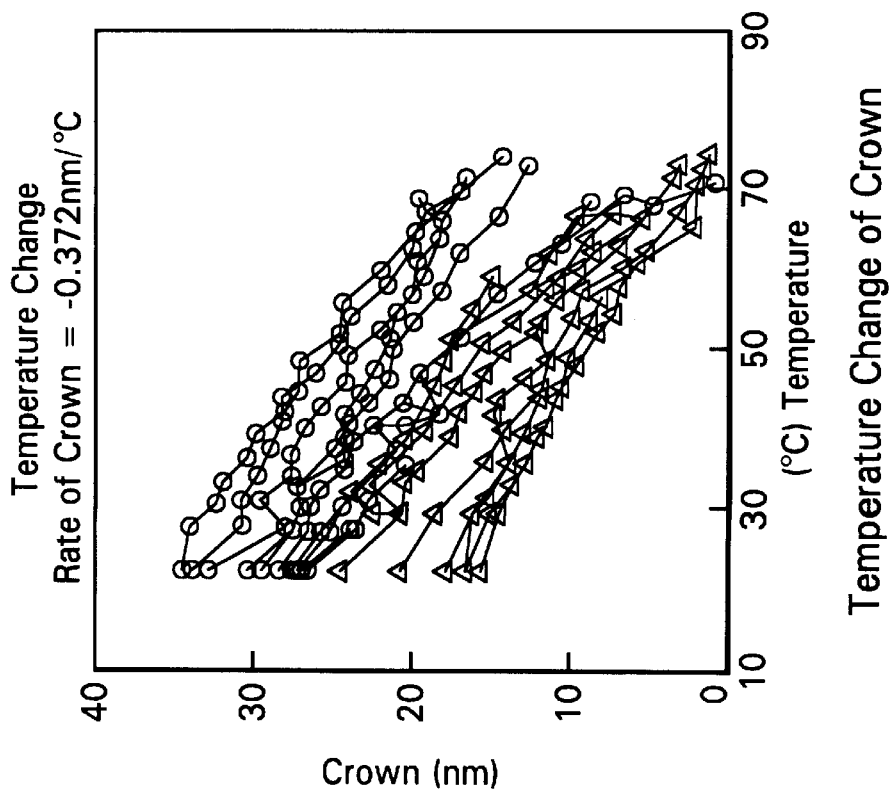

The rails described below are divided into the following portions. Side rails 91 (right-hand side) and 92 (left-hand side) are used as a pair so that the side rails can keep the balance in the left and right sides with receiving positive pressure in both sides. Here, the pair of side rails is not made to be a perfect symmetric shape in consideration of influences of the skew angle in FIG. 9 and the like. In addition, in order that the pair of these side rails does not contact even if the pair performs a rolling (FIG. 5) at a certain pitching angle, it is a sufficient condition that the pair is extended to a vicinity of the outflow edge, 93 even if the pair does not reach the outflow edge. Furthermore, although steps are provided outside side edges of both side rails 91 and 92, these are plays in a production process that become necessary for continuously producing the slider in the lateral direction. Thus, these are provided for large individual difference not occurring in the characteristics of the slider by the areas of the side rails changing because of a cut part overlapping with the side rail due to a manufacturing error.

A cross rail 94 is an element to intercept airflow at the inflow edge side for generating the negative pressure. This is a form commonly used for a negative pressure slider. It is possible to provide a taper 95 (refer to the side view in the right-hand side) rising from the inflow edge, and this taper is also used for adjusting the pitching angle. By providing the delicate taper, a crash of the inflow edge is prevented and the pitching angle is adjusted.

A write transducer and read magnetizing means, 42 are mounted on a center rail 96 (in the vicinity of the outflow edge, 93). The center rail 96 is a rail entirely receiving the positive pressure. This rail is also called an island because this rail is independent of other rails. A front edge 97 is formed with this rail continuing from the outflow edge and extending toward the inflow edge side in the longitudinal direction (crown direction). A major reason why this rail is formed continuously from the outflow edge 82 is to mount the magnetic head in the vicinity of the outflow edge. The front edge 97 can have a pointed shape. In addition, it is possible to suppose a hypothetical border line 98 in parallel to the lateral direction along the outflow edge or inflow edge to both side rails with setting the front edge 97 as the datum. This hypothetical border line 98 will be used later for calculation of areas.

Other (residual) parts of the slider surface that are not these rails are formed in the substantially same depth. Against the rails forming the substantially same plane, concave portions or steps in the common depth are provided. Here, let an edge, where a step is formed, be called a side edge. Nevertheless, as described above, only the front edge of the center rail, 97 is specially named.

Most of materials forming the slider are ceramic mixed compounds ($Al_2O_3TiC$) composed of titanium carbide (TiC) and alumina ($Al_2O_3$). Nevertheless, a part of material in a range from the outflow edge at a distance of 42 $\mu$m in the longitudinal direction (in the vicinity of the outflow edge 93) is composed of alumina ($Al_2O_3$) so as to realize mounting of the write transducer and read magnetizing means, a part of the material may protrude with temperature rise.

Here, the principle of the alumina protrusion will be described. The alumina protrusion means a phenomenon of a location, where the write transducer or read magnetizing means is mounted, protruding toward this side on this paper (FIG. 11 or 12) due to expansion of the alumina alloy with the temperature rise. In general, the alumina alloy protrudes with temperature rise, and retreats with temperature fall. When the part of the slider protrudes, the relative distance between the protruding location and magnetic disk is shorten, and hence the flying height becomes low. Here, it should be noted that the hydrodynamic flying characteristic of the slider like a change of the crown and a change of the camber does not so much change. Thus, it is not necessary to introduce the concept of the sensitivity. By the way, the distance between the write transducer and read magnetizing means is not so large that difference between measuring positions is not critical.

Dimensions of Negative Pressure Slider

As for the dimensions of the sliders, presently, practical application up to sliders called pico-sliders (these are also called 30% sliders in the industry) that are subminiature is on going. For reference, dimensions of a pico-slider adopted in the experiment in the present invention are 1.25% 1.0% 0.3 $mm^3$. In FIG. 12, dimensions of a slider surface are shown in the unit of $\mu$m ($\mu$m=$10^3$ nm). Since dimensions are shown along only dimension lines, the dimensions are not confused with reference numbers used for description of this specification.

Dimensions corresponding to the depth direction to this paper, as described above, include the depth of the concave portions or step that form the same plane and are common in rails. For reference, these dimensions of the pico-slider adopted in this experiment in the present invention are set to be 5.25 $\mu$m in locations sandwiched by the center rail and the pair of side rails and 5.70 $\mu$m in residual locations.

Evaluation of Slider Having Slider Surface of FIG. 12

Figure 10B:
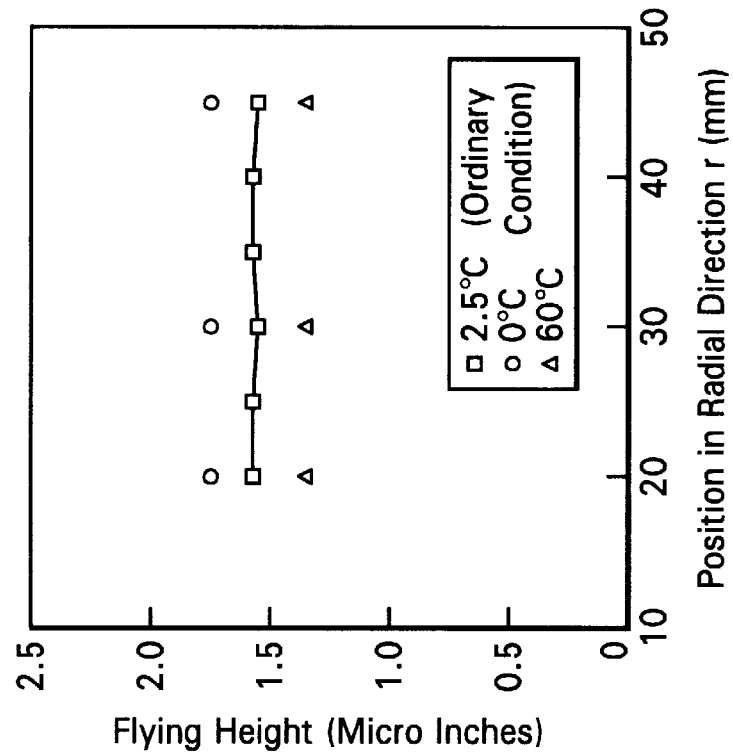
FIGS. 10(*a*) and 10(*b*) are graphs showing results of hydrodynamically simulating absolute flying height in a range from the most internal position in the radial direction to the most outer in a magnetic disk so as to compare data of ratios of the crown sensitivity to the camber sensitivity of the flying height, FIG. 10(*a*) is a graph showing the simulation result of an A-type slider where the sensitivity ratio is 1:4, and FIG. 10(*b*) is a graph showing the simulation result of a B-type slider where the sensitivity ratio is 9:1.
Figure 10A:
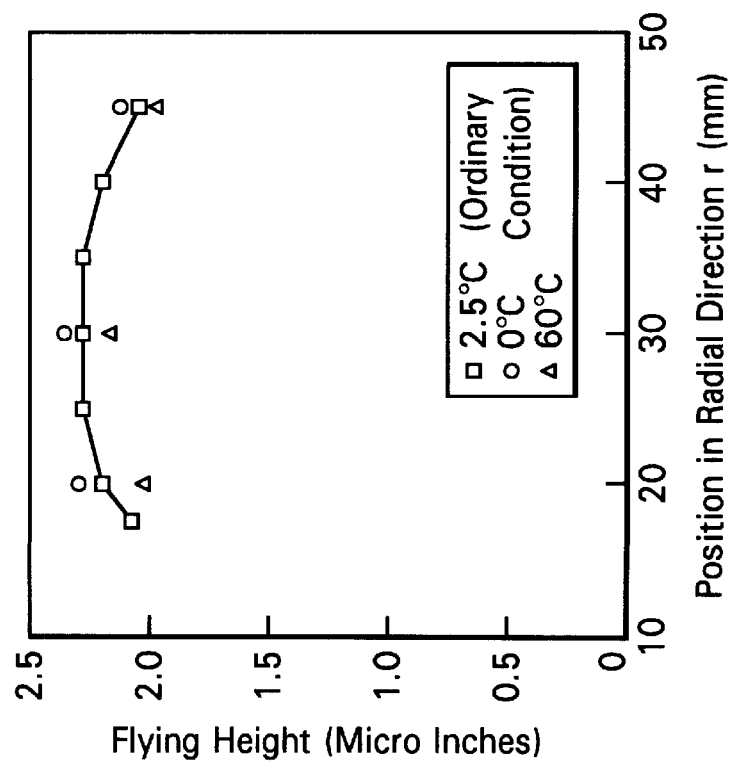
Figure 13:
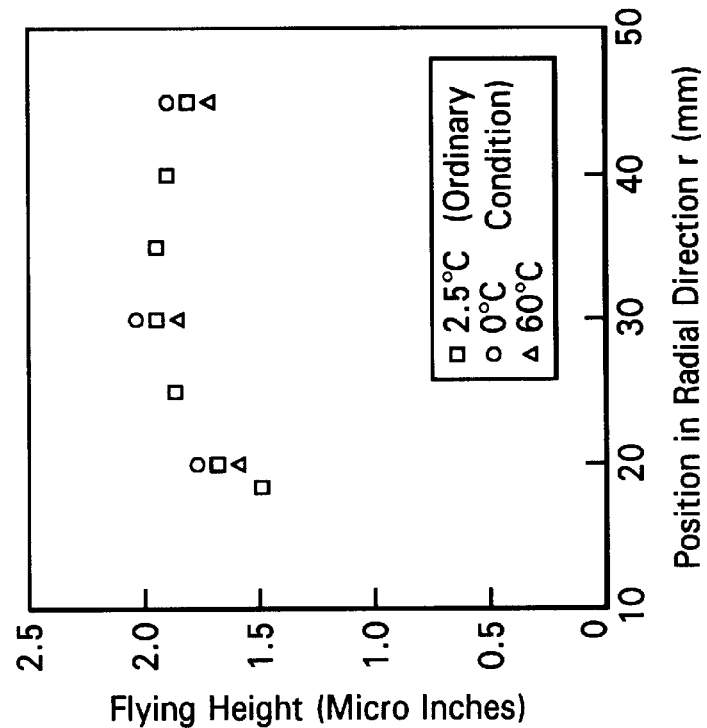
FIG. 13 is a graph showing a result of simulating absolute flying height of the slider having the air bearing surface shown in FIGS. 11 and 12 as a simulation similar to that in FIG. 10.

FIG. 13 is a graph showing the result of hydrodynamically simulating the flying height in regard to a slider (1:5) having the slider surface shown in FIG. 12. This is the same evaluation method as that in FIG. 10. In consequence, the evaluation result is better than that of the A-type slider (1:4) shown in FIG. 10(*a*).

Calculation of Areas in Slider Surface

A calculation method of an area that is important so as to actualize the technical idea of the present invention in terms of the slider surface will be described first.

An area of a reverse step surface, R is a range of a reverse step set in the slider surface. This is an area enclosed by an inside side edge of the cross rail, an inside side edge of the center rail, and the hypothetical border line (98 in FIG. 11) extending from the front edge of the center rail in the lateral direction. In this enclosed range, the substantial negative pressure is generated. The meaning of generating the substantial negative pressure is to be comprehended in such wide meaning that it is allowable that the negative pressure is not generated in a part of the range so long as the negative pressure necessary for a function of the negative pressure slider can be generated. Nevertheless, it is known that it is necessary that setting is performed so that the center of the substantially negative pressure approximately coincides with the center of the slider surface. Nevertheless, the meaning of "setting is performed so that the center of the substantially negative pressure approximately coincides with the center of the slider surface" is not complete coincidence of centers. Thus, it is to be widely comprehended that the offset of centers is allowable, so long as the negative pressure slider can perform its functions as a negative pressure slider and actualize the technical idea of the present invention.

An area of the center rail, C is an area of a part forming the center rail. This rail is independent of other rails, and hence it is easy to delimit the range.

It is easy to calculate the actual areas of the areas R and C by considering the ranges in FIG. 11 and the actual dimensions in FIG. 12 in combination. An area ratio of the area of the reverse step surface, R and the area of the center rail, C is 5 (this expression is an abbreviation of 5/1, and hence the denominator 1 is omitted). In addition, this slider has a delicate taper $\alpha$ of 0.01 radian (about 0.57° in case of 90° set as a right angle).

Relation Between Crown Sensitivity of Flying Height and Camber Sensitivity of Flying Height and Area Ratio R/C Through the experiment for actualizing the technical idea of the present invention, the present inventor experientially found approximate correlation between the crown sensitivity of flying height/camber sensitivity of flying height and the area ratio R/C that are described above as a design technique. In the design of the A-type slider (1:4) and B-type slider (9:1), it is taken into account that this correlation exists.

Figure 14A:
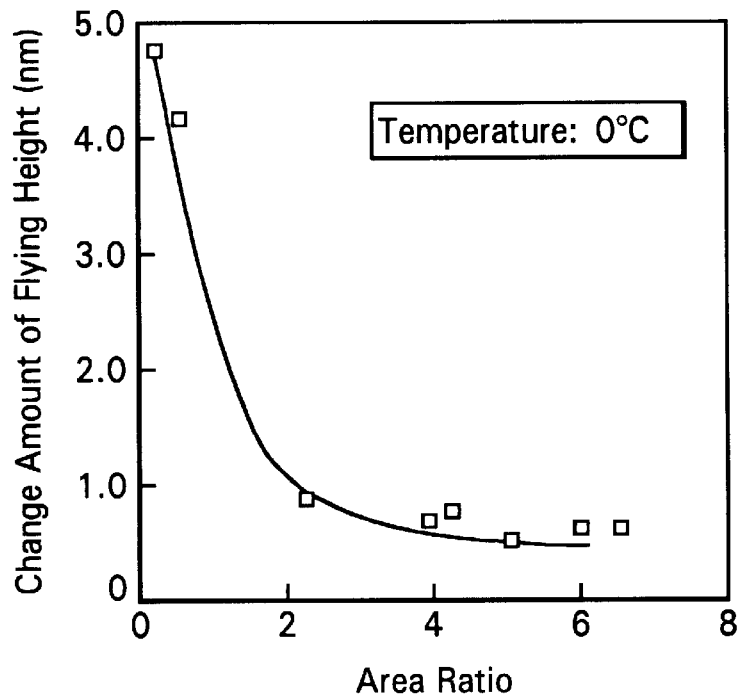
FIGS. 14(*a*) and 14(*b*) are graphs showing change amounts of flying height in case of changing the area ratio R/C of an area of a reverse step surface, R to an area of a center rail, C at 0° C.
Figure 14B:
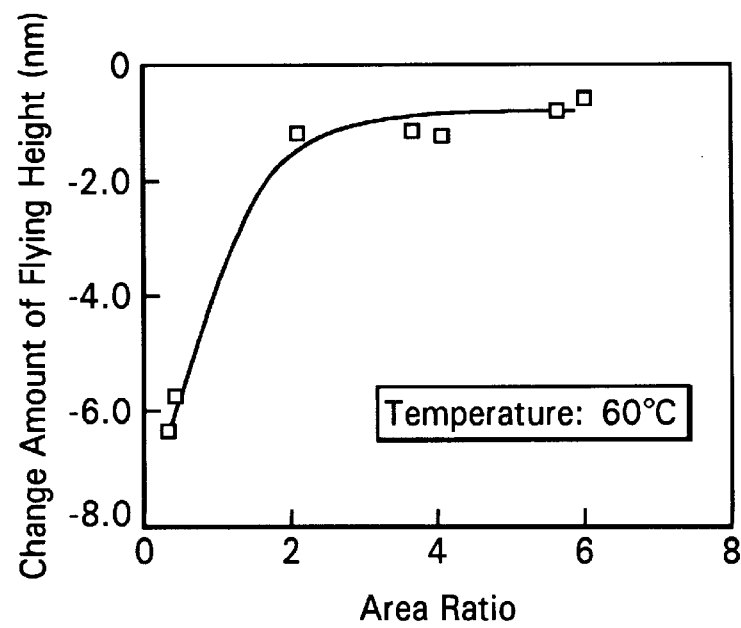

FIGS. 14(*a*) and 14(*b*) are graphs showing the change amount of the flying height in case of the area ratio R/C being changed. With setting 25° C., which is the temperature in an ordinary state, as a basis, FIG. 14(*a*) shows the correlation at 0° C., and FIG. 14(*b*) shows the correlation at 60° C. Here, the present inventor obtained such data that it is possible to suppress the change amount of the flying height at a small value within the range of the area ratio R/C of 4 to 6 (this expression also is abbreviation, and a denominator 1 is omitted). Nevertheless, the present inventor obtained good data also within the range of the area ratio R/C of 2 to 4. In addition, the present inventor obtained such data that, if the area ratio is 5 in particular in the range, it is possible to suppress the flying height change to a minimum. Thus, it is demonstrated that the technical idea of the present invention is effectively actualized through the area ratio of the area of the center rail, C to the area of the reverse step surface, R being set within the range of 1:4 to 1:6.

The amount of the alumina protrusion can be also obtained separately from this area ratio. Nevertheless, it is possible to indirectly considering the alumina protrusion by incorporating the alumina protrusion into the flying height change regarding the camber with considering the alumina protrusion beforehand.

What is claimed is:

1. A negative pressure slider, comprising:
    a slider surface for facing a surface of a rotating magnetic disk and flying at a desired flying height relative thereto, wherein a set range of a reverse step surface for generating negative pressure includes a center of the slider surface, and further is set by a ratio of a crown sensitivity of the flying height to a camber sensitivity of the flying height, such that when a temperature change alters the flying height, a change in the crown changes the flying height and is substantially canceled by a change in the camber which also changes the flying height; and wherein
    the set range is 1:2 to 1:6 and is defined as an area ratio of an area of a center rail to an area of the reverse step surface.

2. The negative pressure slider of claim 1, wherein the ratio of the crown sensitivity to camber sensitivity is set so that the changes in flying height due to the crown and camber changes, which occur with the temperature change, are substantially canceled due to a change in an amount of an alumina protrusion on the slider surface, which also occurs with the temperature change.

3. The negative pressure slider of claim 2, wherein a ratio of the crown sensitivity to the camber sensitivity is set at 1:4.

4. The negative pressure slider of claim 1, wherein a ratio of the crown sensitivity to the camber sensitivity is set at 1:4.

5. A negative pressure slider having a slider surface for facing a surface of a rotating magnetic disk and flying at a desired flying height relative thereto, the slider surface comprising:
    a pair of side rails extending from an inflow edge side to at least a vicinity of an outflow edge in a crown direction;
    a cross rail extending in a camber direction so as to mutually connect the pair of side rails in the inflow edge side;
    a center rail disconnected from one of the pair of side rails and the cross rail, and extending from the outflow edge to the inflow edge side in the crown direction to form a front edge;
    a reverse step surface enclosed by an inner side edge in a camber direction of the cross rail, an inner side edge in the crown direction of each side rail, and a hypothetical border line extending from the front edge of the center rail to the pair of side rails in the camber direction, and being set so that a center of negative pressure generated substantially coincides with a center of the slider surface; and wherein
    an area ratio of an area of the center rail to an area of the reverse step surface is set within a range of 1:2 to 1:6.

6. The negative pressure slider of claim 5, wherein the area ratio is set within a range of 1:4 to 1:6.

7. The negative pressure slider of claim 5, wherein a taper is provided so that the taper starts from an inflow end of the cross rail and terminates in a slider surface of the cross rail, and wherein the area ratio is set to approximately 1:5.

8. A suspension assembly, comprising:
    a negative presume slider having a slider surface for facing a surface of a rotating magnetic disk and flying at a desired flying height relative thereto, wherein a set range of a reverse step surface for generating negative pressure includes a center of the slider surface, and further is set by a ratio of a crown sensitivity of the flying height to a camber sensitivity of the flying height, such that when a temperature change alters the flying height, a change in the crown changes the flying height and is substantially canceled by a change in the camber which also changes the flying height; and
    a suspension supporting the negative pressure slider to traverse the surface of the magnetic disk; and wherein
    the set range is 1:2 to 1:6 and is defined as an area ratio of an area of a center rail to an area of the reverse step surface.

9. An actuator mechanism assembly, comprising:
    a negative pressure slider having a slider surface for facing a surface of a rotating magnetic disk and flying at a desired flying height relative thereto, wherein a set range of a reverse step surface for generating negative pressure includes a center of the slider surface and further is set by a ratio of a crown sensitivity of the flying height to a camber sensitivity of the flying height such that when a temperature change alters the flying height, a change in the crown changes the flying height and is substantially canceled by a change in the camber which also changes the flying height;
    a suspension supporting the negative pressure slider to traverse the surface of the magnetic disk; and
    an actuator mechanism positioning the negative pressure slider at a desired position on the magnetic disk by driving the suspension; and wherein
    the set range is 1:2 to 1:6 and is defined as an area ratio of an area of a center rail to an area of the reverse step surface.

10. A hard disk drive, comprising:
    a rotatable magnetic disk having a surface;
    a negative pressure slider having a slider surface facing the surface of the magnetic disk and flying at a desired flying height relative thereto, wherein a set range of a reverse step surface for generating negative pressure includes a center of the slider surface, and further is set by a ratio of a crown sensitivity of the flying height to a camber sensitivity of the flying height, such that when a temperature change alters the flying height, a change in the crown changes the flying height and is substantially canceled by a change in the camber which also changes the flying height;
    a suspension on supporting the negative pressure slider to traverse the surface of the magnetic disk; and
    an actuator mechanism positioning the negative pressure slider at a desired position on the magnetic disk by drive the suspension; and wherein
    the set range is 1:2 to 1:6 and is defined as an area ratio of an area of a center rail to an area of the reverse step surface.

* * * * *